of
UNITED STATES PATENT OFFICE.

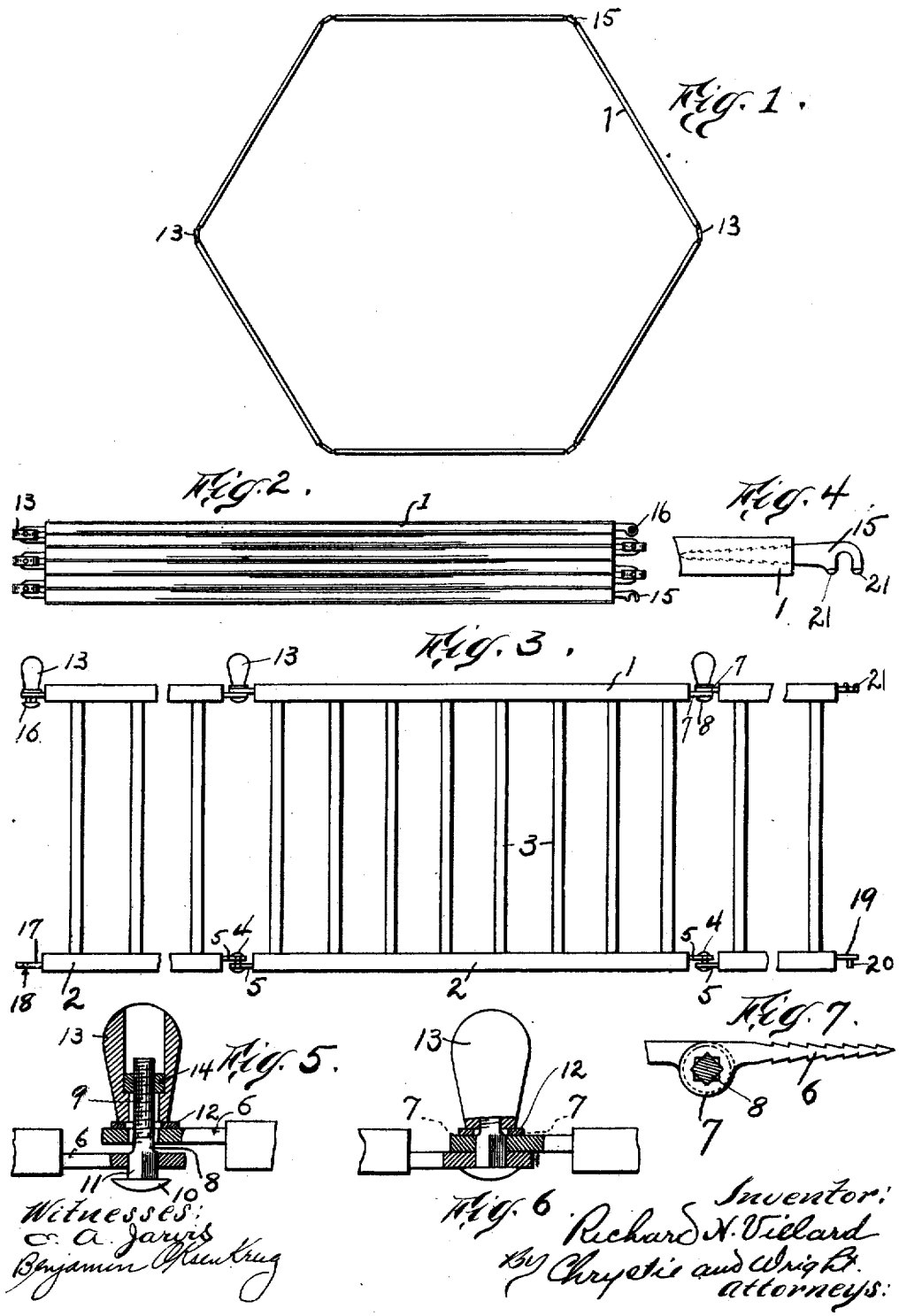

RICHARD H. VILLARD, OF NEW YORK, N. Y.

PORTABLE BABY-FENCE.

No. 913,075.   Specification of Letters Patent.   Patented Feb. 23, 1909.

Application filed September 29, 1908. Serial No. 455,377.

*To all whom it may concern:*

Be it known that I, RICHARD H. VILLARD, a citizen of the United States residing at New York city, in the borough of Manhattan, county and State of New York, have invented certain new and useful Improvements in Portable Baby-Fences, of which the following is a clear, full, and exact description.

The object of this invention is to provide an improved baby fence or the like, so constructed that a child confined within the limits of the fence will not readily be able to climb out, and at the same time to secure a rigid structure of panels pivoted one on the other, and joined in the shape of a closed polygon.

In carrying out my invention I provide independent panels members, comprising horizontal top and bottom rods joined by a number of vertical slats. In the ends of each adjacent panel I provide pivotal means, and I prefer that the top pivotal means shall be composed of a clamp to prevent angular motion of one panel with relation to the next. A special form of clamp, which will readily secure these parts and be at the same time easy to loosen by a grown person, will be described hereinafter. The two panels which form the free or end terminals of the fence when the same is collapsed, are provided with coupling members, which can be removably secured together as will be described.

The scope of my invention will be set forth in the claims.

In the accompanying drawings, Figure 1 is a plan view of the baby fence constructed according to my invention, having six sides. Fig. 2 is an enlarged view of the fence of Fig. 1 in collapsed position. Fig. 3 is a side elevation, partly broken away, of the fence, showing the free terminal coupling. Fig. 4 is a detailed plan of the upper detachable coupling. Fig. 5 is a sectional side elevation of the clamping means in loosened position. Fig. 6 is a partial sectional side elevation of the device of Fig. 5 in lock position. Fig. 7 is a section in plan on line 7—7 Fig. 6.

My improved fence consists of a number of panels, each panel preferably composed of an upper horizontal rod 1 joined together by suitable vertical slats or rods 3. I prefer that the adjacent lower horizontal rods 2 be freely pivoted together by rivets 4, passing through plates 5 secured one to each lower horizontal rod 2, in any suitable way. I prefer that all pivot plates be secured to their rods by elongated projections 6, such as shown in Fig. 7, having reversely sharpened teeth, so that the same may be driven lengthwise into the rods, and there held, though I do not limit myself to such means.

Plates 7 are secured in like manner to the upper horizontal rods 1, and instead of having a plain circular opening, I prefer that the opening have a jagged edge, such as shown in Fig. 7, where eight right angular recesses are shown equally disposed around the perimeter. Through the plates 7 I project a bolt 8 having a threaded part 9, a head 10 and a square shoulder 11. The shoulder preferably has a depth of twice the thickness of one of the plates 7. A washer 12 surrounds the screw 8, and a thumb nut 13 preferably provided with flat sides and carrying a machine nut 14 in its interior, fits over the bolt 8, so that upon tightening the device, as shown in Fig. 6, the parts will be locked in positive position, in view of the square shoulder 11 occupying and fitting four of the right angular recesses in the two plates 7. In order to disengage this coupling means to fold or collapse the fence, one need only unscrew the thumb nut 13 to place it in the position of Fig. 5, and then press downwardly on the thumb nut, which, as it engages the bolt 8, will push the square shoulder out of at least one of the plates 7, so that the fence may be collapsed. The upper horizontal rod 1 of one terminal panel, instead of being supplied with a closed plate 7, is provided with a bifurcated or hooked plate 15, so that it may be passed over the bolt or screw of the opposite terminal 16, which may then be tightened to secure that terminal. The horizontal rods 2 of the free or end panel sections are provided, one with a plate 17 having an aperture 18 therein, and the other with a plate 19 having a pin 20 that may be slipped into the aperture 18 of the plate 17.

Although I have shown the plate 15, Fig. 4, with plain sides, it may, if desired, be formed with notches or right angle recesses, such as shown in Fig. 7. As shown in Figs. 3 and 4, I prefer to turn up the ends 21 of the bifurcated hook 15, so that when the hook is passed over the bolt 16, and the thumb nut 13 is screwed down, the washer 12 will be secured in place below the turned up ends of the bifurcated hook 15, and thus lock the same against displacement until an ample number of turns of the thumb nut has been accomplished to loosen the same.

I claim as my invention:

1. The herein described portable baby fence, comprising a plurality of panel sections more than four in number, pivotally jointed one to the other, and foldable on each other so that alternate panels will lie one on one side and the other on the other side of an intermediate panel, and a clutch member at the joints adapted to positively lock said sections from movement relatively to one another, and means for securing the free or end sections together to form an inclosed polygon.

2. The herein described portable baby fence, comprising a plurality of sections pivotally secured one to the other, and means for joining the free or end members of said section to form an inclosed polygon, the pivotal joints of said fence consisting of plates having angular recesses, a bolt having a polygonal shoulder thereon for positive engagement of the recesses of at least two plates, a turn nut adapted to draw said shoulder through two of said plates, said turn nut engaging the thread of the bolt, so that when the nut is loosened, it may be depressed to cause the polygonal shoulder to disengage at least one of the plates.

Signed at New York city this 23rd day of September 1908.

RICHARD H. VILLARD.

Witnesses:
F. WARREN WRIGHT,
MABEL DITTENHOEFER.